US012002072B1

(12) United States Patent
Burriesci et al.

(10) Patent No.: US 12,002,072 B1
(45) Date of Patent: Jun. 4, 2024

(54) SYSTEMS AND METHODS FOR AUTOMATICALLY MANAGING PLACEMENT OF CONTENT SLOTS IN AN INFORMATION RESOURCE

(71) Applicant: GOOGLE LLC, Mountain View, CA (US)

(72) Inventors: Matthew Strecker Burriesci, Half Moon Bay, CA (US); Willa Angel Chen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 1019 days.

(21) Appl. No.: 14/856,181

(22) Filed: Sep. 16, 2015

(51) Int. Cl.
G06Q 30/0273 (2023.01)
G06Q 30/0241 (2023.01)

(52) U.S. Cl.
CPC ..... G06Q 30/0273 (2013.01); G06Q 30/0241 (2013.01)

(58) Field of Classification Search
CPC .. G06F 17/2247; G06F 16/958; G06F 16/957; G06F 16/9577; G06F 16/951; G06F 17/211; G06F 2221/2119; G06F 40/14; G06F 3/04842; H04L 67/02; H04L 67/42; G06Q 50/01; G06Q 30/0273; G06Q 30/0241; G06Q 30/0207–0277
See application file for complete search history.

(56) References Cited

U.S. PATENT DOCUMENTS 6,496,803 B1 12/2002 Seet et al.
6,907,566 B1 6/2005 McElfresh et al.
(Continued)

FOREIGN PATENT DOCUMENTS

CN 102102937 A 6/2011
EP 2 843 607 A1 3/2015
(Continued)

OTHER PUBLICATIONS

Communication pursuant to Article 94(3) EPC for EP13190732.1 dated Oct. 6, 2015. (4 pages).
International Preliminary Report on Patentability for PCTUS2016049240 dated Dec. 20, 2017 (25 pages).
International Search Report and Written Opinion, International Application No. PCT/US2016/049240, dated Oct. 26, 2016.
(Continued)

*Primary Examiner* — Chinyere Mpamugo
(74) *Attorney, Agent, or Firm* — MARSHALL, GERSTEIN & BORUN LLP

(57) ABSTRACT

At least one aspect is directed to a method of a method of automatically managing placement of content slots in an information resource. The method includes a data processing system receiving, from a computing device, a request for content and, in response, transmitting a content slot insertion script to the computing device. The content slot insertion script, when executed, can cause the computing device to identify one or more Document Object Model (DOM) elements included in the DOM tree of the information resource and determine one or more candidate third-party content placement locations according to a third-party content placement policy. The second plurality of computer-executable instructions, when executed on the computing device, can also cause the computing device to select, from the candidate third-party content placement locations, a third-party content placement location in the DOM tree and display a third-party content item at the selected ad placement location.

19 Claims, 5 Drawing Sheets

(56) References Cited

U.S. PATENT DOCUMENTS

| | | | |
|---|---|---|---|
| 7,213,200 B2 | 5/2007 | Abe et al. | |
| 8,176,414 B1* | 5/2012 | Baluja | G06F 40/103 |
| | | | 715/252 |
| 8,375,305 B1 | 2/2013 | Strand | |
| 2006/0206380 A1 | 9/2006 | Joo | |
| 2009/0007171 A1 | 1/2009 | Casey et al. | |
| 2010/0169767 A1 | 7/2010 | Ishiguro | |
| 2010/0241497 A1 | 9/2010 | Rittman et al. | |
| 2010/0332328 A1 | 12/2010 | Dharmaji et al. | |
| 2011/0137737 A1 | 6/2011 | Baird et al. | |
| 2011/0145045 A1 | 6/2011 | Murphy et al. | |
| 2012/0260157 A1 | 10/2012 | Zhu et al. | |
| 2013/0204715 A1 | 8/2013 | Zhang | |
| 2013/0204867 A1 | 8/2013 | Lim et al. | |
| 2013/0212498 A1 | 8/2013 | Lim et al. | |
| 2013/0339139 A1 | 12/2013 | Meyers et al. | |
| 2014/0245125 A1* | 8/2014 | Ozgul | G06F 40/106 |
| | | | 715/234 |
| 2015/0066665 A1 | 3/2015 | Long et al. | |
| 2015/0254219 A1 | 9/2015 | Harel | |
| 2016/0300262 A1* | 10/2016 | Gao | H04L 67/53 |

FOREIGN PATENT DOCUMENTS

| | | |
|---|---|---|
| JP | 2010-134854 | 6/2010 |
| JP | 2011-053815 | 3/2011 |
| JP | 2011-108146 | 6/2011 |
| KR | 1020080042051 | 5/2008 |
| WO | WO-2011/111167 | 9/2011 |
| WO | WO-2013/181671 A1 | 12/2013 |

OTHER PUBLICATIONS

U.S. Office Action on U.S. Appl. No. 14/012,571 dated Nov. 18, 2016.
U.S. Office Action on U.S. Appl. No. 14/012,571 dated May 26, 2017.
Written Opinion of the International Preliminary Examining Authority for PCT/US2016/049240 dated Sep. 21, 2017. (7 pages).
"Can I protect my website from client side ad injection?," http://stackoverflow.com/questions/30680599/can-i-protect-my-website-from-client-side-ad-injection (Sep. 2015).
"MTNL To Hijack Your Browser And Insert Pop-Up Ads. Is It Legal?," http://trak.in/tags/business/2015/06/24/mtnl-hijack-pop-up-ads-browser-legal/ (Sep. 2015).
Ad Code—Adzerk Knowledge Base—Aug. 19, 2013 http://help.adzerk.com/Ad_Code.
International Search Report and Written Opinion on Application No. PCT/US2013/059469 dated Jun. 2, 2014.
Kapravelos, A., et al., "Hulk: Eliciting Malicious Behavior in Behavior in Browser Extensions," http://cs.ucsb.edu/~kapravel/publications/usenix2014_hulk.pdf (2014).
Final Office Action on U.S. Appl. No. 14/012,571 dated Jul. 24, 2018.
Office Action for KR Appl. No. 10-2017-7031465, dated Sep. 10, 2018.
Decision of Rejection for Korean Application No. 10-2017-7031465 dated Apr. 29, 2019.
Notice of Allowance on U.S. Appl. No. 14/012,571 dated Feb. 25, 2019.
Notice of Allowance on U.S. Appl. No. 14/012,571 dated Apr. 25, 2019.
Corrected Notice of Allowability for U.S. Appl. No. 14/012,571 dated Jun. 4, 2019 (3 pages).
Examination Report for EP Appln. Ser. No. 16763646.3 dated Jan. 14, 2020 (8 pages).
Notice of Reasons for Rejection for JP 2017-551269 dated Feb. 25, 2020 (18 pages).
Decision of Rejection for JP Appln. Ser. No. 2017-551269 dated Aug. 3, 2020 (19 pages).
Examination Report for IN Appln. Ser. No. 201747034702 dated Sep. 24, 2020 (6 pages).
Examination Report for EP Appln. Ser. No. 16763646.3 dated Apr. 29, 2020 (6 pages).
US Office Action on U.S. Appl. No. 14/012,571 DTD Jan. 12, 2018.
Communication EPC for Application No. EP13190732.1, dated Feb. 4, 2015.
Examination Report for GB Application No. 1717422.8, Dec. 7, 2021.
Final Office Action for U.S. Appl. No. 17/147,101, dated Nov. 9, 2023.
Final Office Action for U.S. Appl. No. 17/147,101, dated Sep. 28, 2022.
First Examination Report for GB Application No. 1717422.8, dated May 18, 2021.
First Office Action for Chinese Application No. 201680027514.3, dated Apr. 20, 2021.
Non-Final Office Action for U.S. Appl. No. 17/147,101, dated Apr. 27, 2023.
Non-Final Office Action for U.S. Appl. No. 17/147,101, dated Jun. 8, 2022.
Oral proceedings for European Application No. 16763646.3, dated Dec. 3, 2021.
Oral proceedings for European Application No. 16763646.3, dated Jun. 2, 2021.
Oral proceedings for European Application No. 16763646.3, dated Oct. 22, 2021.

* cited by examiner

SYSTEMS AND METHODS FOR AUTOMATICALLY MANAGING PLACEMENT OF CONTENT SLOTS IN AN INFORMATION RESOURCE

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

SUMMARY

At least one aspect is directed to a method of automatically managing placement of content slots in an information resource. The method includes a data processing system that includes one or more processors receiving, from a computing device, a request for content responsive to the computing device receiving an information resource including a first plurality of computer-executable instructions from a content publisher. The first plurality of computer-executable instructions identify a server of the data processing system. The method also includes the data processing system transmitting a second plurality of computer-executable instructions to the computing device. The second plurality of computer-executable instructions, when executed on the computing device, can cause the computing device to identify a Document Object Model (DOM) tree of the information resource, identify one or more DOM elements included in the DOM tree and determine one or more candidate third-party content placement locations according to a third-party content placement policy. The second plurality of computer-executable instructions, when executed on the computing device, can also cause the computing device to select, from the candidate third-party content placement locations, a third-party content placement location in the DOM tree and display a third-party content item at the selected third-party content placement location.

In some implementations, the third-party content placement policy includes one or more rules for identifying candidate third-party content placement locations. The rules can be based on dimensions of the identified DOM elements. In some implementations, determining one or more candidate third-party content placement locations according to a third-party content placement policy includes determining a predetermined number of third-party content placement locations and responsive to determining the predetermined number of candidate third-party content placement locations, terminating the instructions to determine candidate third-party content placement locations. In some implementations, selecting a third-party content placement location in the DOM tree includes selecting a third-party content placement location that is between two adjacent DOM elements that have a width that is greater than a predetermined threshold of a width of the information resource.

In some implementations, displaying a third-party content item at the selected third-party content placement location includes identifying a revenue amount corresponding to displaying the third-party content item, determining that the revenue amount exceeds a predetermined threshold, and selecting the third-party content item for display responsive to determining that the revenue amount exceeds the predetermined threshold. In some implementations, the second plurality of computer-executable instructions includes computer-executable instructions, which when executed on the computing device, further can cause the computing device to identify a number of existing third-party content placements to be displayed on the information resource, determine that the number of existing third-party content placements is less than a predetermined number of third-party content placements and displaying the third-party content item at the selected third-party content placement location responsive to determining that the number of existing third-party content placements is less than a predetermined number of third-party content placements.

In some implementations, the second plurality of computer-executable instructions, when executed on the computing device, further can cause the computing device to insert a third-party content slot at the selected third-party content placement location. The third-party content slot includes computer executable instructions, which when executed on the computing device, can cause the computing device to request a third-party content item from the data processing system. In some implementations, the second plurality of computer-executable instructions, when executed on the computing device, further can cause the computing device to receive a third-party content item from the data processing system and determine to display the third-party content item responsive to determining that a revenue associated with the received third-party content item exceeds a threshold value.

At least one aspect is directed to a method of automatically managing placement of content slots in an information resource in real time. The method includes a data processing system that includes one or more processors receiving, from a computing device, a request for an information resource and transmitting the information resource including a content slot insertion script to the computing device. The content slot insertion script, when executed on the computing device, can cause the computing device to identify a Document Object Model (DOM) tree of the information resource, identify one or more DOM elements included in the DOM tree and determine one or more candidate third-party content placement locations according to a third-party content placement policy. The content slot insertion script, when executed on the computing device, can also cause the computing device to select, from the candidate third-party content placement locations, a third-party content placement location in the DOM tree and display a third-party content item at the selected third-party content placement location.

In some implementations, the third-party content placement policy includes one or more rules for identifying candidate third-party content placement locations. The rules can be based on dimensions of the identified DOM elements. In some implementations, determining one or more candidate third-party content placement locations according to a third-party content placement policy includes determining a predetermined number of third-party content placement locations and responsive to determining the predetermined number of candidate third-party content placement locations, terminating the instructions to determine candidate third-party content placement locations. In some implementations, selecting a third-party content placement location in the DOM tree includes selecting a third-party content placement location that is between two adjacent DOM elements that have a width that is greater than a predetermined threshold of a width of the information resource.

In some implementations, displaying a third-party content item at the selected third-party content placement location includes identifying a revenue amount corresponding to displaying the third-party content item, determining that the revenue amount exceeds a predetermined threshold, and selecting the third-party content item for display responsive to determining that the revenue amount exceeds the predetermined threshold. In some implementations, the content slot insertion script includes computer-executable instructions, which when executed on the computing device, further can cause the computing device to identify a number of existing third-party content placements to be displayed on the information resource, determine that the number of existing third-party content placements is less than a predetermined number of third-party content placements and displaying the third-party content item at the selected third-party content placement location responsive to determining that the number of existing ad placements is less than a predetermined number of ad placements.

In some implementations, the content slot insertion script, when executed on the computing device, further can cause the computing device to insert a third-party content slot at the selected third-party content placement location. The third-party content slot includes computer executable instructions, which when executed on the computing device, cause the computing device to request a third-party content item from the data processing system. In some implementations, the content slot insertion script, when executed on the computing device, further can cause the computing device to receive a third-party content item from the data processing system and determine to display the third-party content item responsive to determining that a revenue associated with the received third-party content item exceeds a threshold value.

At least one aspect is directed to a system for automatically managing placement of content slots in an information resource. The system can include a resource analysis module executing on a computing device and configured to identify one or more Document Object Model (DOM) elements included in a DOM tree of an information resource, responsive to a request for content for display with the information resource. The system also includes a placement location module executing on the computing device and configured to employ a third-party content placement policy to determine a plurality of candidate third-party content locations in the DOM tree at which to insert a third-party content item. The system can also include a location selection module executing on the computing device and configured to select one of the determined plurality of candidate third-party content placement locations. The system can also include a content display module executing on the computing device and configured to cause a third-party content item to be displayed at the selected third-party content placement location.

In some implementations, the third-party content placement policy includes one or more rules for identifying candidate third-party content placement locations. The rules can be based on dimensions of the identified DOM elements. In some implementations, determining one or more candidate third-party content placement locations according to a third-party content placement policy can include determining a predetermined number of third-party content placement locations and responsive to determining the predetermined number of candidate third-party content placement locations, terminating the instructions to determine candidate third-party content placement locations. In some implementations, selecting a third-party content placement location in the DOM tree can include selecting a third-party content placement location that is between two adjacent DOM elements that have a width that is greater than a predetermined threshold of a width of the information resource.

In some implementations, causing a third-party content item to be displayed at the selected third-party content placement location includes identifying a revenue amount corresponding to displaying the third-party content item, determining that the revenue amount exceeds a predetermined threshold, and selecting the third-party content item for display responsive to determining that the revenue amount exceeds the predetermined threshold. In some implementations, the content display module can identify a number of existing third-party content placements to be displayed on the information resource, determine that the number of existing third-party content placements is less than a predetermined number of third-party content placements and display the third-party content item at the selected third-party content placement location responsive to determining that the number of existing third-party content placements is less than a predetermined number of third-party content placements.

In some implementations, the location selection module can insert a third-party content slot at the selected third-party content placement location. The third-party content slot includes computer executable instructions, which when executed on the computing device, can cause the computing device to request a third-party content item from the data processing system. In some implementations, the content display module can receive a third-party content item from the data processing system and determine whether to display the third-party content item responsive to determining that a revenue associated with the received third-party content item exceeds a threshold value.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
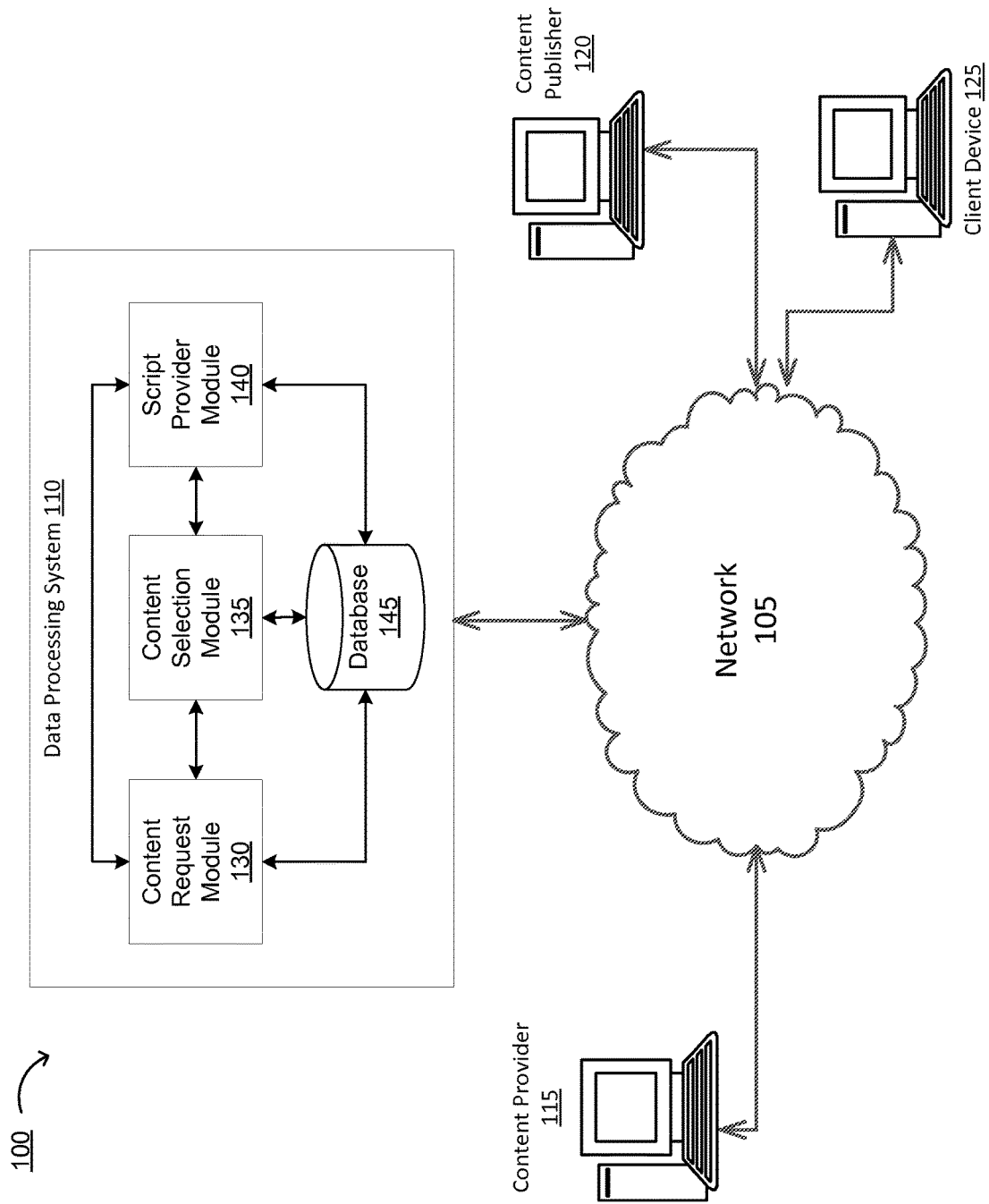
FIG. 1 is a block diagram depicting an implementation of an environment for providing third-party content for display with information resources on client devices.

Following below are more detailed descriptions of various concepts related to, and implementations of, methods, apparatuses, and systems of controlling the display of content of information resources in a computer network environment. The various concepts introduced above and discussed in greater detail below may be implemented in any of numerous ways, as the described concepts are not limited to any particular manner of implementation.

For many information resources, such as pages, the respective layouts of the pages do not maximize page utility to users, publishers, or a third-party, such as advertisers or an advertisement network. For instance, a user can visit a webpage that includes only one third-party content slot. In such an instance, many third-party content providers (such as remarketers, or a large but brief brand campaign) may want to reach the user at the time the user visits or accesses the webpage. The third-party content providers may be willing to pay more than what the publisher of the web page earns for an average third party content slot to have their content presented to the user visiting the webpage. Given that the web page may include fewer number of third-party content slots than the number of third-party content providers willing to present respective third-party content items to the user, the content publisher may desire to insert additional third-party content slots in the webpage to accommodate the third-party content providers, and at the same time, increase revenue generated from the user's visit to the webpage. In addition, the publisher may not have adequate resources to dynamically add third-party content slots in response to an increase in requests for posting third-party content items on the publisher's information resource.

A content publisher can increase the number of third-party content slots included in a respective web page by manually modifying the script of the web page to include additional third-party content slots. However, the manual insertion of third-party content slots would not allow the content publisher to control the number of third-party content slots to display to a user in real time (at the time the information resource is rendered for display on the computing device). For instance, manual insertion of content slots may not be adequate in the case where the content publisher may only choose to insert additional third-party content slots if the revenue generated from the additional third-party content slots is greater than a predetermined threshold. Further, varying the number of third-party content slots shown on a web page based on the user, the revenue difference, among other parameters may not be achieved in real time when using manual insertion of content slots. Moreover, a content publisher of a large number of web pages may have to manually update each of the web pages to include additional content slots, which can be extremely time consuming.

The present disclosure relates to systems and methods for automatically managing the placement of content slots on a web page in real time at the client side with minimal publisher involvement. By being able to manage the placement of content slots on the client side, a system can optimize the placement of content slots based on various goals of a user, publisher or content provider, such as an advertiser. Furthermore, the system can identify signals from historic web page interactions and adapt the placement of the content slots to increase engagement. Furthermore, the system can make intelligent decisions regarding the placement, size, and format of the content slots being inserted. Signals can include the web page format, the device type on which the web page is displayed, and other elements on the web page, including images, video, text blocks, titles/headers, among others. In addition, the system can insert calls of actions or other content objects within the web page to increase user engagement.

In the present disclosure, a data processing system can allow for automatic and dynamic adjustments in the number of third-party content slots inserted within a web page. In response to a request, from a client device, for third-party content to be displayed on the web page, the data processing system can send a content slot insertion script to the client device. The content slot insertion script, when executed on the client device, can identify a Document Object Model (DOM) tree of the information resource, identify one or more DOM elements included in the DOM tree and determine one or more candidate ad placement locations according to an ad placement policy. The content slot insertion script can also cause the computing device to select, from the candidate ad placement locations, an ad placement location in the DOM tree and display an ad at the selected ad placement location. Using the content slot insertion script, the data processing system can automatically and dynamically adjust (e.g., increase or decrease) the number of third-party content slots inserted in a web page to be displayed on a client device responsive to the client device requesting access to the web page. In this way, based on one or more parameters, the same web page can be served with a different number of third-party content slots on different client devices without any involvement from the content publisher.

FIG. 1 is a block diagram depicting one implementation of an environment for automatically managing placement of content slots in an information resource The environment 100 includes at least one data processing system 110. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third-party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of advertisements (ads) or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application (such as a gaming application, global positioning system (GPS) or map application or other types of applications) on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third-party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end-user can submit requests to receive content. The requests can be requests to a search engine and the requests can include search queries. In some implementations, the requests can include a request to access a web page.

The content provider computing devices 115, the content publisher computing device 120 and the client devices 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider computing devices 115, the content publisher computing devices 120, and the client devices 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider computing devices 115, the content publisher computing device 120 and the client devices 125 (e.g., a built-in display, microphone, etc.) or external to the housing of content provider computing devices 115, the content publisher computing device 120 and the client devices 125 (e.g., a monitor connected to the user computing device 115, a speaker connected to the user computing device 115, etc.), according to various implementations. For example, the content provider computing devices 115, the content publisher computing device 120 and the client devices 125 can include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 can include a third-party content placement system, e.g., an ad server or ad placement system. The data processing system 110 can include at least one content request module 130, at least one content selection module 135, at least one script provider module 140 and at least one database 145. The content request module 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items (e.g., advertisements), and content slot insertion script, among others, to serve to a client device 125.

The content request module 130 can receive a request for content from the client device 125. The request for content can include a request for an information resource, a request for one or more third-party content items, a request for a content slot insertion script or a combination thereof. In some implementations, the request for content can include a request for third-party content. In some implementations, the request for third-party content can include an address or identifier of an information resource on which the third-party content is to be displayed. The request for third-party content can also include or identify one or more parameters that can be used by the data processing system 110 to determine the content to provide in response to the request for content. The parameters can identify a size of a content slot within which to insert the requested content. The parameters can identify a type of content associated with the information resource, a type of third-party content requested (e.g., text, image, video, etc.), client device information, size information for requested third-party content item or a combination thereof. In some implementations, the request can identify a content slot insertion script. In some implementations, the request for content can include an identifier indicating that the content publisher of the resource information is subscribed to or has otherwise opted in to a content slot insertion service.

In some implementations, the request for content can include a request for an information resource. The request for an information resource can include an address or identifier of the information resource. For example, the request for the information resource can include a Uniform Resource Locator (URL) of a specific resource such as a webpage (e.g., "http://www.example.com"). The request for information resource can also include client device information (such as a device type, device identifier or a combination thereof).

In some implementations, the request for content can include a request for a content slot insertion script. In some implementations, the request for the content slot insertion script can include an indication of the requested script, an address or identifier of a resource information or a combination thereof. In some implementations, the request for the content slot insertion script can identify a content slot insertion script. In some implementations, the request for the content slot insertion script can include an identifier indicating that the content publisher of the resource information is subscribed to or has otherwise opted in to a content slot insertion service. In some implementations, the content request module 130 can be configured to parse the request for content and determine to forward the request for content to the content selection module 135 or to the script provider module 140. For instance, if a content slot insertion script is determined to be sent to the client device 125 in response to the received request for content, the content request module 130 can forward the request for content to the script provider module 140. Otherwise, the request module 130 can forward the request for content to the content selection module 135. In some implementations, the content request module 130 can determine to forward the request for content to both the content selection module 135 and the script provider module 140. The content request module 130 can determine whether or not a script is to be sent to the client device 125 based on the type of the request for content (e.g., a request for an information resource, a request for third-party content or a request for a content slot insertion script), an indicator in the content request (e.g., an indicator indicative of a content slot insertion script or an indicator indicating that an information resource is eligible for content slot insertion), an information resource identifier in the request for content or a combination thereof. In some implementations, the content request module 130 can determine whether or not a script is to be sent to the client device 125 by comparing an identification of the information resource to a list of information resource identifiers (e.g., resource information identifiers eligible for receiving the content slot insertion script). In some implementations, the information resource identifier can be a URL. In some implementations, the information resource identifier can be a domain to which the information resource belongs. In some implementations, the information resource identifier can be an IP address corresponding to a server hosting the information resource. In some implementations, the content request module 130 can automatically forward the request for content to the content selection module 135 without checking whether or not a script is to be sent to the client device 125.

The content selection module 135 can be configured to determine content to be transmitted to the client device 125 in response to a received request for content. The content selection module 135 can determine the content to be sent to the client device 125 based on information included in the request for content. For instance, upon receiving a request for an information resource, the content selection module 135 can use the address or identifier of the information resource in the request for content to determine the content to send to the client device. In the case of receiving a request for one or more third-party content items, the content selection module 135 can select the third-party content item(s) based on an address or identifier for the information resource on which the third-party content item is to be presented, content type information (e.g., sports, news, music, movies, travel, etc.) for the information resource, size information of the slot(s) in which the third-party content item(s) is/are to be displayed, client device information (e.g., device type, device identifier, device location, etc.). In some implementations, the request for third-party content can also include a minimum revenue amount (or minimum bid value) for displaying a third-party content item on the information resource. In some implementations, the content selection module 135 can communicate with an advertising auction system and provide the advertising auction system information included in the request for third-party content received from the client device. The content selection module 135 can also receive one or more third-party content items from the advertising auction system responsive to providing the information included in the request for third-party content. In some implementations, the content selection module 135 can access the database 145 and retrieve the content for sending to the client device 125.

In some implementations, the content selection module 135 can be configured to determine whether or not a script is to be sent to the client device 125 in response to the request for content. The content selection module 135 can determine whether or not a script is to be sent to the client device 125 based on the type of the content request (e.g., a request for an information resource, a request for third-party content or a request for a content slot insertion script), an indicator in the request for content (e.g., an indicator indicative of a content slot insertion script or an indicator indicating that an information resource is eligible for content slot insertion), an information resource identifier in the request for content or a combination thereof. In some implementations, the content selection module 135 can determine whether or not a script is to be sent to the client device 125 by comparing an identification of the information resource to a list of information resource identifiers (e.g., information resource identifiers eligible for receiving the content slot insertion script). Upon determining that a script is to be sent to the client device 125, the content selection module 135 can forward the request for content or an indication thereof to the script provider module 140. In some implementations, the content selection module 135 can still select a third-party content item to send to the client device 125 along with a script, such as the content slot insertion script.

The script provider module 140 can be configured to retrieve a content slot insertion script from the database 145 and transmit the retrieved script to the client device 125 (or to another entity for sending to the client device 125). In some implementations, the content slot insertion script can be transmitted to the client device 125 separately or with a third-party content item. In some implementations, the script provider module 140, the content selection module 135 or another entity of the data processing system 110 can send the content slot insertion script together with a requested information resource to the client device 125. For instance, the script provider module 140, the content selection module 135 or another entity of the data processing system 110 can insert the content slot insertion script into the information resource before sending the information resource to the client device 125.

The content slot insertion script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the client device 125, such as the application that caused the client device 125 to transmit the content request received by the content request module 130. The application can include, for example, an Internet browser, a mobile application, a gaming application, a GPS application, or any other computer program capable of reading and executing the computer-executable instructions. In brief overview, the computer-executable instructions, when executed by a processor of the client device 125, can cause an application of the client device to: (a) identify a Document Object Model (DOM) tree of the information resource, (b) identify one or more DOM elements included in the DOM tree, (c) determine one or more candidate ad placement locations according to an ad placement policy, (d) select, from the candidate ad placement locations, an ad placement location in the DOM tree, and (e) display an ad at the selected ad placement location. Additional details relating to the functions of the content slot insertion script are provided herein with respect to FIGS. 2, 3 and 4.

Figure 2:
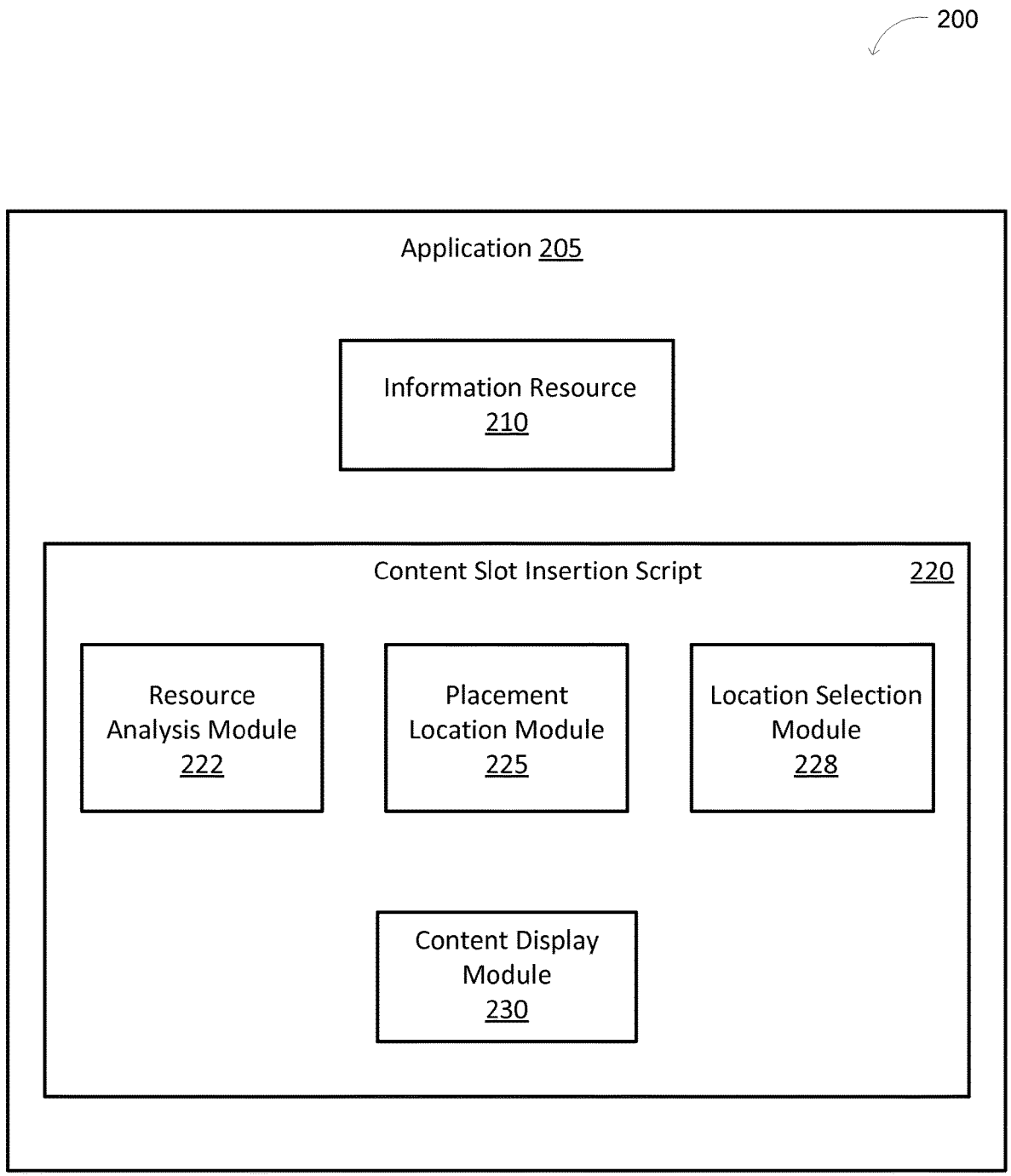
FIG. 2 is a block diagram depicting one implementation of a content slot insertion system for managing the placement of third-party content slots in an information resource, according to an illustrative implementation.

Referring to FIG. 2, FIG. 2 is a block diagram depicting one implementation of a content slot insertion system 200 for automatically managing placement of content slots in an information resource, according to an illustrative implementation. The content slot insertion system 200 can include an application 205, an information resource 210, a resource analysis module 222, a placement location module 225, a location selection module 228 and a content display module 230. In some implementations, the resource analysis module 222, the placement location module 225, the location selection module 228 and the content display module 230 can be modules within a content slot insertion script 220. The content slot insertion system 200 can be run or otherwise be executed by one or more processors of a computing device, such as those described below in FIG. 5. In some implementations, any of the resource analysis module 222, the placement location module 225, the location selection module 228 and the content display module 230 can be part of the application 205, information resource 210 or the content slot insertion script 220. The application 205 can include, for example, an Internet browser, mobile application, gaming application, GPS application, or any other computer program capable of executing or otherwise invoking computer-executable instructions, such as the computer-executable instructions included in the information resource 210, the resource analysis module 222, the placement location module 225, the location selection module 228 and the content display module 230. The information resource 210 can include one or more content portions (or content elements). The information resource 210 can specify the positions of the one or more content elements. In some implementations, the information resource 210 can include a Document Object Model (DOM) tree that specifies the shape, size, positions, and/or other attributes of the one or more content elements. In some implementations, the content elements can correspond to DOM elements that are included in the DOM tree.

The application 205 can obtain or receive the information resource 210 from a server of a content publisher of the information resource or a server hosting the information resource. For instance, the application 205 can send a request including an address or an identifier of the information resource 210 to the server and, in response, receive the information resource 210. In some implementations in which the server is the data processing system 110 shown in FIG. 1, the application 205 can receive the content slot insertion script 230 along with the information resource 210. For instance, the application 205 can receive the content slot insertion script 220 inserted within the information resource 210.

In some implementations, upon receiving the information resource 210, the application 205 can send a request for content to the data processing system 110. The request for content can be a request for a third-party content item. For instance, the information resource 210 can include a third-party content slot, which can include computer-executable instructions to cause the application 205 to generate and transmit a request for content to the data processing system 110. When the computer-executable instructions of the third-party content slot are executed as part of the information resource 110), the computer-executable instructions cause the application 205 (via the client device 125) to send a request for content requesting a third-party content item from the data processing system 110. The request for content can include an address or identifier of the information resource 210, indication of the information resource content type, size information of the third-party content slot, client device information, a minimum publisher revenue value or a combination thereof. In some implementations, the request for content can include an indication of the content slot insertion script 220. In some implementations, the request for content can include a request for the content slot insertion script 220.

In response to the request for content, the application 205 can receive the content slot insertion script 220 from the data processing system 110 or another server. For instance, the application 205 can receive the content slot insertion script 220 together with a third-party content item for insertion within the third-party content slot that included the instructions to send the request for content to the data processing system 110. In some implementations, the application 205 can receive the content slot insertion script 220 with no third-party content item. In some implementations, the application 205 can receive the content slot insertion script 220 with a plurality of third-party content items for insertion in one or more of the content slots that may be inserted into the information resource. The application 205 (or a processor of the client device 125) can execute the content slot insertion script 220. In some implementations, executing the content slot insertion script 220 includes executing the resource analysis module 222, the placement location module 225, the location selection module 228, the content display module 230 or a combination thereof.

The resource analysis module 222 can include one or more computer-executable instructions, which can be executed on the client device 125. The resource analysis module 222 can cause the computing device to identify the Document Object Model (DOM) tree of the information resource 210. The resource analysis module 222 can cause the client device 125 to identify the DOM tree of the information resource for inspecting by the resource analysis module 222. In some implementations, identifying the DOM tree of information resource 210 can include accessing the DOM tree of the information resource 210. In some implementations, the resource analysis module 222 can cause the computing device to generate a DOM tree from the instructions included in the information resource received from the server of the content publisher of the information resource. In some implementations, the application 205 can include computer-executable instructions to generate the DOM tree of the information resource 210.

The resource analysis module 222 can cause the client device 125 to identify one or more DOM elements included in the DOM tree of the information resource 210 by inspecting the DOM tree of the information resource 210. In some implementations identifying one or more elements in the DOM tree can include identifying one or more parent nodes of the DOM tree and identifying elements representing visible content items associated with the identified parent nodes(s). For instance, the resource analysis module 222 can identify the top most node in the DOM tree that is representative of the entire information resource 210. The resource analysis module 222 can identify a parent node of a sub-tree of the DOM tree that is representative of a region of the information resource 210. The resource analysis module 222 can then determine visible content items associated with the identified node(s) in the DOM tree. In some implementations, the resource analysis module 222 can determine elements of the DOM tree representative of visible content items by parsing all, or a portion, of the DOM tree (for instance, without necessarily identifying parent nodes of the DOM tree or sub-trees therein).

The resource analysis module 222 can determine one or more elements in the DOM tree that represent visible content items, for instance, by parsing or inspecting the DOM tree or a portion thereof. In some implementations, the resource analysis module 222 can identify visible content items within the information resource 210 by checking the type, name or other attributes of elements in the DOM tree. Examples of elements that represent visible content items include a text node that contains a non-whitespace character, an image, an <HR> tag, an <IFRAME> tag, and <EMBED> tag, <an OBJECT> tag, a <VIDEO> tag, amongst others. In some implementations, the resource analysis module can identify that an element represents a visible content item by checking the style attributes of an element or a parent thereof. For instance, if a "visibility" attribute or an "overflow" attribute associated with a given element or a parent thereof is set to hidden, that element (or an item associated therewith) would not be visible when the information resource 210 is displayed. Also, a "display" attribute set to "none" or a "clip" attribute being defined can lead to the element (or the item associated therewith) not being visible when the information resource is displayed on the client device 125.

The resource analysis module 222 can also determine the bounds of the identified elements representing visible content items. For instance, resource analysis module 222 can identify the bounds of each of the identified elements representing visible content items from the DOM tree. Such bounds can be defined, for instance, by two or more corners of a rectangle (or square) and/or coordinates of left, right, top, and bottom boundaries. Bounds of an element representing a visible content item can be defined as a rectangle that fully contains the visible content item when rendered on the client device. In some implementations, coordinates of such bounds can be expressed in terms of absolute pixels from the top, left corner of a browser pane. Identifying elements of the DOM tree that represent visible content items and determining respective bounds allows for determining adequate candidate third-party content placements (or eliminating non-adequate candidate third-party content placements) in terms of the bounds (or sizes) of existing visible content items. For instance, visible content items having a dimension parameter exceeding a minimum value can be selected for anchoring additional third-party content placement locations.

Upon identifying one or more elements in the DOM tree, the placement location module 225, when executed on the client device 125, can determine a plurality of candidate third-party content placement locations in the DOM tree based on a third-party content placement policy. In some implementations, the third-party content placement policy can include rules based on dimensions of the identified DOM elements In some implementations, the placement location module 225 can select one or more identified DOM elements representing visible content items around which a candidate third-party content placement location can be defined. The placement location module 225 can select such elements based on respective sizes (or bounds information). For instance, the placement location module 225 can select elements representing visible content items with respective width or height larger than (or equal to) typical widths or heights of third-party content items. The placement location module 225 can then determine candidate third-party content placement locations adjacent to the selected elements. In some implementations, the placement location module 225 can determine candidate third-party content placement locations for inserting third-party content items by analyzing the bounds information (such as coordinates) of the identified DOM elements that represent visible content items. In some implementations, the placement location module 225 can use predefined minimum size or dimension values for locations or regions adequate for placing third-party content items (such as ads).

Figure 3:
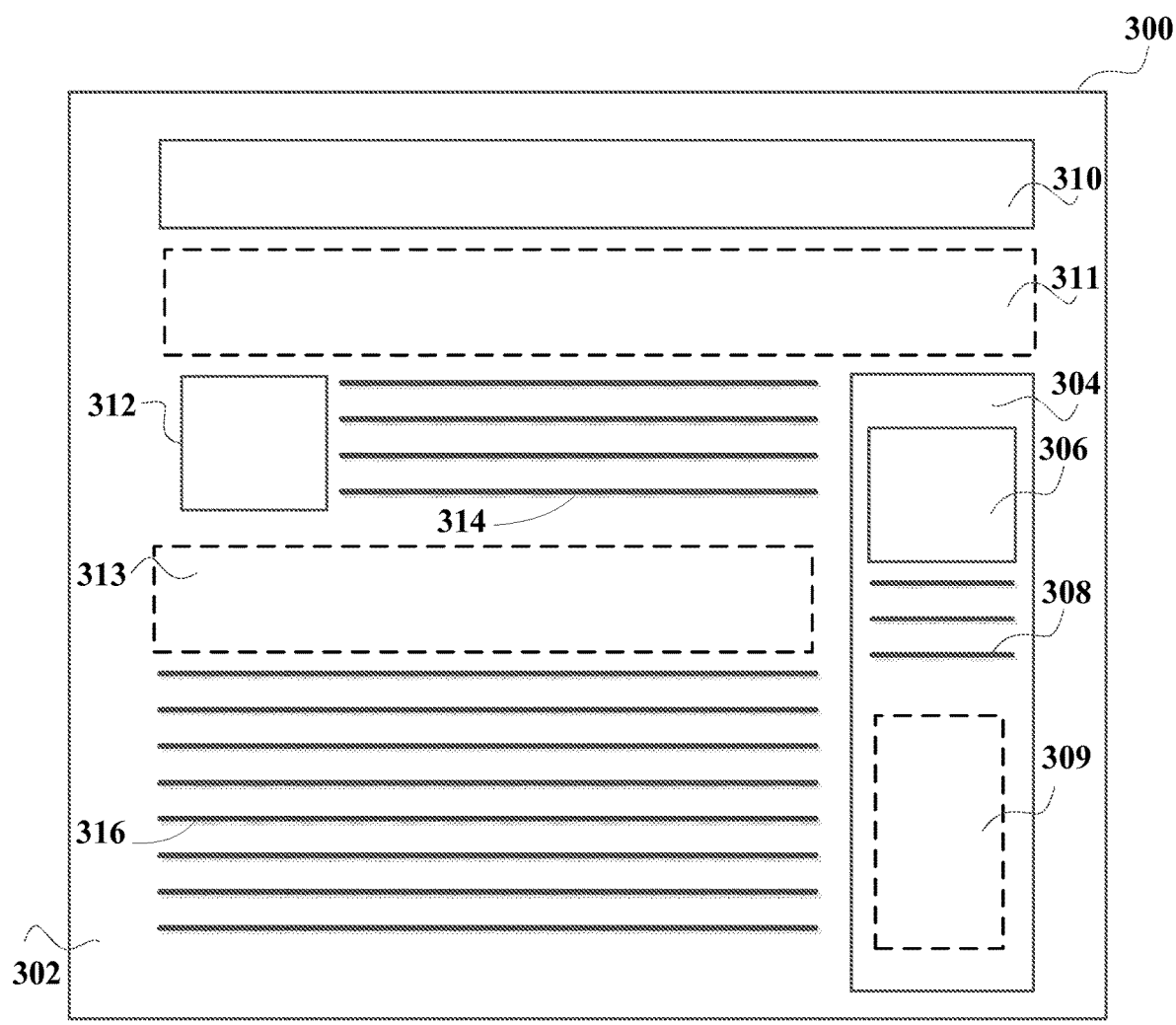
FIG. 3 is a block diagram illustrating a structure of an information resource and additional third-party content placement locations identified therein.

Referring now also to FIG. 3, FIG. 3 is a block diagram depicting a layout of an information resource 300 including candidate third-party content placement locations identified by the placement location module 225. The information resource (e.g., a web page) 300 includes a main frame portion 302 and a side frame portion 304. The main frame portion 302 includes a header region 310, an image region 312, a first text region 314 and a second text region 316. The header region 310 extends across a substantial portion of the main frame portion 302. The side frame portion includes an image region 306 and a text region 308. Each of these regions can be associated with respective bounds in the DOM tree.

The placement location module 225 identifies the regions 311 and 313 in the main frame portion 302 and the region 309 in the side frame portion 304 as candidate third-party content placement locations based on the dimensions of the DOM elements originally in the information resource 300. The candidate placement location 311 is defined as a horizontally elongated rectangle arranged between the header region 310 and the first text region 314. The candidate placement location 313 is defined as a horizontally elongated rectangle arranged between the first text region 314 and the second text portion 316. The candidate placement location 309 is defined as a vertically elongated rectangle arranged in the side frame portion 304 adjacent to (e.g., beneath) the between the text portion 308.

In some implementations, the third-party content placement policy can include a rule or constraint specifying a maximum number of candidate placement locations to be determined. The placement location module 225 can determine a predetermined number of third-party content placement locations and responsive to determining that the predetermined number of candidate third-party content placement locations is exceeded, the placement location module 225 can terminate the instructions to determine candidate third-party content placement locations. For instance, if the predetermined number of third-party content placement locations is equal to three, the placement location module 225 can terminate the process of identifying candidate placement locations once the placement location module 225 identifies the first three candidate third-party content placement locations.

In some implementations, the third-party content placement policy can include other rules imposing constraints on the candidate placement locations. For instance, considering the example in FIG. 3, the placement location module 225 can be configured not to define candidate placement locations above the header region 310, to the right of the side frame portion 304. In some implementations, the placement policy can include rules to prevent confusing locations such as between an image and a respective caption (such as between the image portion 306 and the text portion 308). In some implementations, the placement policy can include rules for selecting third-party content placement locations based on features or information associated with a website of the information resource. For instance, when identifying the third-party placement locations, the placement location module 225 can cause the client device to take into account the website format, the website content and/or whether or not the website is mobile optimized. For instance, the placement location module 225 can cause the client device to adjust the size(s) and number of candidate third-party placement locations to identify based on the number of images or videos in the information resource. The placement location module 225 also can cause the client device to reduce the size(s) and/or number of placement locations to identify if the website is mobile optimized. Also, the placement location module 225 can cause the client device to determine whether the website has a responsive web design or not when identifying the third-party placement locations. In some implementations, the placement location module 225 can cause the client device to avoid identifying locations adjacent to arrows, "next" buttons or other icons used to navigate through various web pages (or slides) of the website to reduce the number of inadvertent interactions with the ads inserted in such locations.

In some implementations, the placement location module 225 can employ historical performance data (such as click-through-rate data) for existing or previously used placement locations in the publisher's website or other websites to determine the third-party placement locations. For instance, the placement location module 225 can avoid selecting locations that are known to result in low click-through rate or in locations that have a high number of low quality click-through rates. In some implementations, the information resource 210 can include contextual hints (such as a hidden text indicative of potential ad insertion at a given location) for places that may be used as third-party placement locations. The placement location module 225 (or the content insertion script 220) can be configured to employ such contextual hints in identifying candidate placement locations.

The location selection module 228, when executed on the client device, can cause the client device to select one of the determined plurality of candidate third-party content placement locations for inserting a third-party content slot (such as an ad slot). For instance, the location selection module 228 can cause the client device to select a third-party content placement location, among the determined candidate placement locations, that is between two adjacent DOM elements that have a width that is greater than a predetermined threshold of a width of the information resource. For instance, the predetermined threshold can be 80%, 85%, 90% or other percentage value of the width of the information resource 210. Considering the example in FIG. 3, for instance, the candidate placement location 311 is arranged between the header region 310 and the first text region 314. If the predetermined threshold value is 30% of the width of the information resource, both the header region 310 and the first text region 314 have respective widths that exceed 30% of the width of the information resource 310. Accordingly, the location selection module 228 can select the candidate placement location 311. For similar reasons, and by comparing the widths of the first text region 314 and the second text region 316, the location selection module 228 can cause the client device to select the candidate placement location 313. In some implementations, the location selection module 228 can cause the client device to rank the determined candidate third-party content placement locations based on one or more criteria and select a third-party content placement location based on the ranking of the determined candidate third-party content placement locations.

Upon selecting a third-party content placement location, the location selection module 228 (or the content display module 230) can cause the client device to insert a third-party content slot (e.g., ad slot) at the selected third-party content placement location. The third-party content slot can include computer executable instructions, which when executed on the client device 125, cause the client device 125 to request a third-party content item (such as an ad) from the data processing system 110. The client device 125 can send a third-party request for content including, for instance, an address or identifier of the information resource, indication of type of content associated with the information resource, size information for third party content slot, client device information or a combination thereof. In response to the third-party request for content sent to the data processing system 110, the client device can receive a third-party content item for displaying at the inserted third-party content slot.

Upon receiving a third-party content item from the data processing system, the content display module 230 can cause the client device 125 to display the received third-party content tem at the inserted third-party content slot. In some implementations, the content display module 230 can cause the client device to identify a revenue amount corresponding to displaying the received third-party content item and compare the revenue amount to a predetermined threshold value. Upon determining that the revenue amount exceeds the predetermined threshold value, the content display module 230 can cause the client device 125 to select the third-party content item for display within the information resource.

In some implementations, the content display module 230 can cause the client device to receive indication(s) of revenue amounts associated with a plurality of third-party content items for display in a plurality of third-party content slots inserted in the information resource 210 by the location selection module 228. The content display module 230 can be configured to cause the client device to select a subset of the third-party content items, based on the revenue amounts, for display at a subset of the third-party content slots. For instance, in the web page layout shown in FIG. 3, three third-party content slots can be inserted by the location selection module 228 at the placement locations 311, 313 and 309. The content display module 230 can cause the client device to receive three third-party content items with indications of respective revenue amounts, and select only the two third-party content items with the highest revenue amounts for display at the slots inserted at locations 311 and 313.

In some implementations, the content display module 230 can cause the client device to still determine whether or not to display the received third party content item even when determining that the revenue amount exceeds the threshold value. For instance, the content display module 230 can cause the client device 125 to make a decision regarding whether or not to display the third-party content item (when the revenue amount exceeds the threshold value) based on the type of content associated with the received third-party content item, the type of the third-party content item (e.g., text, image or video), a click-through-rate associated with the third-party content item or other criteria. In some implementations, the content display module 230 can be configured to cause the client device to filter received third-party content items based on respective click through rates.

In some implementations, the content display module 230 can cause the client device 125 to identify a number of existing third-party content placement locations (such as image region 306 and text region 308 in FIG. 3) to be displayed on the information resource 210. For instance, the content display module 230 can be configured to cause the client device to check the number of ad slots existing in the information resource before inserting any additional resources. The content display module 230 can cause the client device to identify the number of existing third-party content placement locations by inspecting the DOM tree or a source code of the information resource 210. The content display module 230 can cause the client device to compare the number of existing third-party content placement locations to a predetermined number of third-party content placement locations. The predetermined number of third-party content placement locations can be representative of a specific number or a maximum number of third-party content placement locations that can be included in the information resource 210. In some implementations, the content display module 230 can cause the client device to obtain the predetermined number of third-party content placement locations from the information resource 210 or the application 205. Based on the comparison, the content display module 230 can cause the client device 125 to determine whether or not to display the received third-party content item. For instance, upon determining that the number of existing third-party content placement locations is less than the predetermined number of third-party content placement locations, the client device 125 can display the received third-party content item. In some implementations, the client device 125 can determine not to display the third-party content item upon determining that the number of existing third-party content placement locations is greater than or equal to the predetermined number of third-party content placement locations.

Figure 4:
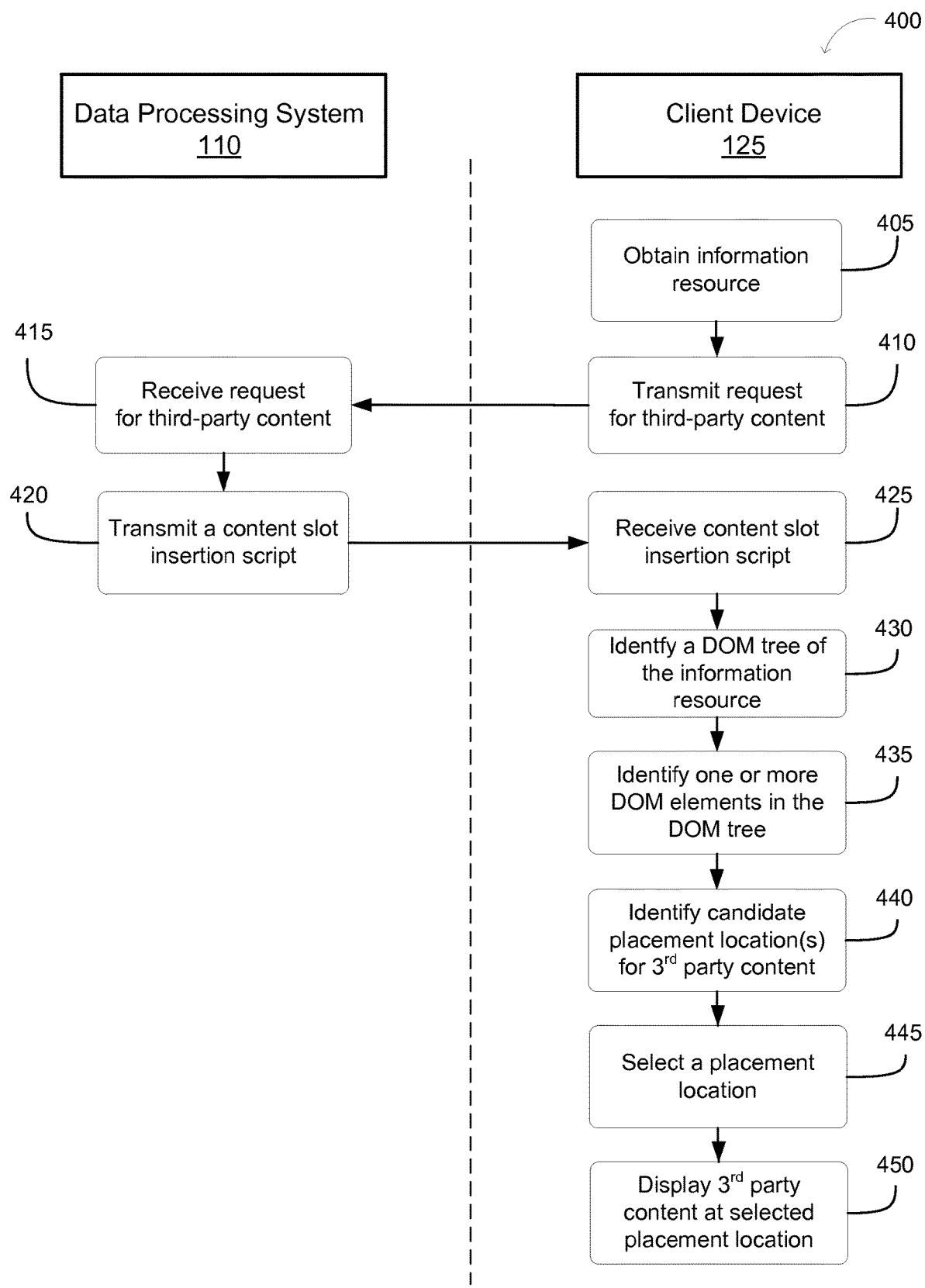
FIG. 4 is flow diagram depicting a method for inserting additional third-party content slots in an information resource, according to an illustrative implementation.

FIG. 4 is flow diagram depicting a method 400 for inserting additional third-party content slots in a web page, according to an illustrative implementation. In brief, the method 400 can include a client device receiving an information resource associated with a respective publisher (BLOCK 405) and transmitting a request for third-party content to a data processing system (BLOCK 410). The method 400 can include the data processing system receiving the request for third-party content (BLOCK 415) and, in response, transmitting a content slot insertion script to the client device (BLOCK 420). The method 400 also can include the client device receiving the content slot insertion script from the data processing system (BLOCK 425). The method 400 can also include, upon executing the content slot insertion script, the client device identifying a DOM tree of the information resource (BLOCK 430), identifying one or more elements in the DOM tree (BLOCK 435), identifying one or more candidate placement locations for displaying third-party content (BLOCK 440), selecting a placement location among the candidate placement locations (BLOCK 445), and displaying a third-party content item at the selected placement locations (BLOCK 450).

The method 400 can include the client device receiving an information resource from a server of a content publisher of the information resource or a server hosting the information resource (BLOCK 405). For instance, the client device or an application thereof can send a request including an address or an identifier of the information resource to the server and, in response, receive the information resource. In some implementations in which the server is the data processing system, the client device can receive the content slot insertion script along with the information resource. For instance, the client device can receive the content slot insertion script inserted within the information resource.

The method 400 can include the client device sending a request for content to a data processing system, upon receiving the information resource (BLOCK 410). The request for content can be a request for a third-party content item. For instance, the information resource can include a third-party content slot, which can include computer-executable instructions to cause the client device to generate and transmit a request for content to the data processing system. When the computer-executable instructions of the third-party content slot are executed as part of the information resource, the computer-executable instructions cause the client device to send a request for content requesting a third-party content item from the data processing system. The request for content can include an address or identifier of the information resource, indication of the information resource content type, size information of the third-party content slot, client device information, a minimum publisher revenue value or a combination thereof. In some implementations, the request for content can include an indication of the content slot insertion script. In some implementations, the request for content can include a request for the content slot insertion script.

The method 400 can include the data processing system receiving the request for content (BLOCK 415) and, in response, transmitting a content slot insertion script to the client device (BLOCK 420). As discussed above, with respect to FIG. 1, the data processing system can determine based on information included in the request for content that the content slot insertion script is to be sent to the client device. In some implementations, the data processing system can send the content slot insertion script together with one or more third-party content items to the client device. In some implementations, the data processing system can respond to the request for content by sending the content slot insertion script to the client device without sending a third party content item.

The method 400 can include the client device receiving the content slot insertion script from the data processing system or another server. For instance, the client device can receive the content slot insertion script together with a third-party content item for insertion within the third-party content slot that included the instructions to send the request for content to the data processing system. In some implementations, the client device can receive the content slot insertion script with no third-party content item. In some implementations, the client device can receive the content slot insertion script with a plurality of third-party content items for insertion in one or more of the content slots that may be inserted into the information resource. The client device (or a processor thereof) can execute the content slot insertion script.

The method 400 can include the client device identifying the DOM tree of the information resource (BLOCK 430). In some implementations, identifying the DOM tree of the information resource can include identifying a name or address of a file including the DOM tree and opening the file. In some implementations, identifying the DOM tree of information resource can include accessing or parsing the DOM tree of the information resource. In some implementations, the client device can generate a DOM tree from the instructions included in the information resource received from the server of the content publisher of the information resource. In some implementations, an application of the client device can include computer-executable instructions to generate the DOM tree of the information resource.

The method 400 can include the client device identifying one or more DOM elements included in the DOM tree of the information resource by inspecting the DOM tree of the information resource (BLOCK 435). The client device can determine one or more elements in the DOM tree that represent visible content items, for instance, by parsing or inspecting the DOM tree or a portion thereof. In some implementations, the client device can identify visible content items within the information resource by checking the type, name or other attributes of elements in the DOM tree. Examples of elements that represent visible content items include a text node that contains a non-whitespace character, an image, an <HR> tag, an <IFRAME> tag, and <EMBED> tag, <an OBJECT> tag, a <VIDEO> tag, amongst others. In some implementations, the resource analysis module can identify that an element represents a visible content item by checking the style attributes of an element or a parent thereof. For instance, if a "visibility" attribute or an "overflow" attribute associated with a given element or a parent thereof is set to hidden, that element (or an item associated therewith) would not be visible when the information resource is displayed. Also, a "display" attribute set to "none" or a "clip" attribute being defined can lead to the element (or the item associated therewith) not being visible when the information resource is displayed on the client device.

The client device can also determine the bounds of the identified elements representing visible content items. For instance, the client device can identify the bounds of each of the identified elements representing visible content items from the DOM tree. Such bounds can be defined, for instance, by two or more corners of a rectangle (or square) and/or coordinates of left, right, top, and bottom boundaries. Bounds of an element representing a visible content item can be defined as a rectangle that fully contains the visible content item when rendered on the client device. In some implementations, coordinates of such bounds can be expressed in terms of absolute pixels from the top, left corner of a browser pane. Identifying elements of the DOM tree that represent visible content items and determining respective bounds allows for determining regions of the information resource that are not to be overlapped when inserting additional third-party content placement locations.

The method 400 can include the client device determining a plurality of candidate third-party content placement locations in the DOM tree based on a third-party content placement policy (BLOCK 440). In some implementations, the third-party content placement policy can include rules based on dimensions of the identified DOM elements In some implementations, the client device can select one or more identified DOM elements representing visible content items around which a candidate third-party content placement location can be defined. The client device can select such elements based on respective sizes (or bounds information). For instance, the client device can select elements representing visible content items with respective width or height larger than (or equal to) typical widths or heights of third-party content items. The client device can then determine candidate third-party content placement locations adjacent to the selected elements. In some implementations, the client device can determine candidate third-party content placement locations for inserting third-party content items by analyzing the bounds information (such as coordinates, width, or height) of the identified DOM elements that represent visible content items. In some implementations, the client device 125 can use predefined minimum size or dimension values for locations or regions adequate for placing third-party content items (such as ads).

As discussed above with regard to FIG. 3, the client device can identify the regions 311 and 313 in the main frame portion 302 and the region 309 in the side frame portion 304 as candidate third-party content placement locations based on the dimensions of the DOM elements originally in the information resource 300. For instance, the region 311 can be identified based on the width of the header portion 310 whereas the region 313 can be identified based on the width of the second text portion 316.

In some implementations, the third-party content placement policy can include a rule or constraint specifying a maximum number of candidate placement locations to be determined. The client device can determine a predetermined number of third-party content placement locations and responsive to determining that the predetermined number of candidate third-party content placement locations is exceeded, the client device can terminate the instructions to determine candidate third-party content placement locations. For instance, if the predetermined number of third-party content placement locations is equal to three, the client device can terminate the process of identifying candidate placement locations once the client device identifies the first three candidate third-party content placement locations.

In some implementations, the third-party content placement policy can include other rules imposing constraints on the locations of candidate placement locations. For instance, considering the example in FIG. 3, the client device can be configured not to define candidate placement locations above the header region 310 or to the right of the side frame portion 304.

In some implementations, the placement policy can include rules to prevent confusing locations such as between an image and a respective caption (such as between the image portion 306 and the text portion 308). In some implementations, the placement policy can include rules for selecting third-party content placement locations based on features or information associated with a website of the information resource. For instance, when identifying the third-party placement locations, the client device can take into account the website format, the website content and/or whether or not the website is mobile optimized. For instance, the client device can adjust the size(s) and number of candidate third-party placement locations to identify based on the number of images or videos in the information resource. The client device also can reduce the size(s) and/or number of placement locations to identify if the website is mobile optimized. Also, the client device can determine whether the website has a responsive web design or not when identifying the third-party placement locations. In instance, the client device can avoid locations adjacent to arrows, "next" buttons or other icons used to navigate through various web pages (or slides) of the website. In some implementations, the client device can employ historical performance data (such as click-through-rate data) for existing or previously used placement locations in the publisher website or other websites to determine the third-party placement locations. For instance, the client device can avoid selecting locations that are known to result in low click-through-rate. In some implementations, the information resource can include contextual hints (such as a hidden text indicative of potential ad insertion at a given location) for places that may be used as third-party placement locations. The content insertion script can be configured to cause client device to read and use such contextual hints when identifying candidate placement locations.

The method 400 can include the client device selecting one of the determined plurality of candidate third-party content placement locations for inserting a third-party content slot (BLOCK 445). For instance, the client device can select a third-party content placement location, among the determined candidate placement locations, that is between two adjacent DOM elements that have a width that is greater than a predetermined threshold of a width of the information resource. For instance, the predetermined threshold can be 30%, 40%, 50% or other percentage value of the width of the information resource. Considering the web page layout shown in FIG. 3, the candidate placement location 311 is arranged between the header region 310 and the first text region 314. If the predetermined threshold value is 30% of the width of the information resource, both the header region 310 and the first text region 314 have respective widths that exceed 30% of the width of the information resource 310. Accordingly, the client device can select the candidate placement location 311. For similar reasons, and by comparing the widths of the first text region 314 and the second text region 316, the client device can select the candidate placement location 313. In some implementations, the client device can rank the determined candidate third-party content placement locations based on one or more criteria and select a third-party content placement location based on the ranking of the determined candidate third-party content placement locations.

Upon selecting a third-party content placement location, the client device 125 can insert a third-party content slot (e.g., ad slot) at the selected third-party content placement location. The third-party content slot can include computer executable instructions, which when executed on the client device, cause the client device to request a third-party content item (such as an ad) from the data processing system. The client device can send a third-party request for content including, for instance, an address or identifier of the information resource, indication of type of content associated with the information resource, size information for third party content slot, client device information or a combination thereof. In response to the third-party request for content sent to the data processing system, the client receive can receive a third-party content item for displaying at the inserted third-party content slot.

The method 400 can include the client device receiving a third-party content item from the data processing system and displaying the received third-party content tem at the inserted third-party content slot (BLOCK 450). In some implementations, the client device can identify a revenue amount corresponding to displaying the received third-party content item and compare the revenue amount to a predetermined threshold value. Upon determining that the revenue amount exceeds the predetermined threshold value, the client device can select the third-party content item for display within the information resource. In some implementations, the client device can receive indication(s) of revenue amounts associated with a plurality of third-party content items for display in a plurality of third-party content slots inserted in the information resource. The client device can be configured to select a subset of the third-party content items, based on the revenue amounts, for display at a subset of the third-party content slots. For instance, in the web page layout shown in FIG. 3, three third-party content slots can be inserted by the client device at the placement locations 311, 313 and 309. The client device can receive three third-party content items with indications of respective revenue amounts, and select only the two third-party content items with the highest revenue amounts for display at the slots inserted at locations 311 and 313.

In some implementations, the client device can still determine whether or not to display the received third party content item even when determining that the revenue amount exceeds the threshold value. For instance, the client device can make a decision regarding whether or not to display the third-party content item (when the revenue amount exceeds the threshold value) based on the type of content associated with the received third-party content item, the type of the third-party content item (e.g., text, image or video), a click-through rate associated with the third-party content item or other criteria or other criteria. In some implementations, the client device can be configured to filter received third-party content items based on respective click through rates.

In some implementations, the client device can identify a number of existing third-party content placement locations (such as image region 306 and text region 308 in FIG. 3) to be displayed on the information resource. For instance, the client device can be configured to check the number of ad slots existing in the information resource before inserting any additional resources. The client device can identify the number of existing third-party content placement locations by inspecting the DOM tree or a source code of the information resource. The client device can compare the number of existing third-party content placement locations to a predetermined number of third-party content placement locations. The predetermined number of third-party content placement locations can be representative of a specific number or a maximum number of third-party content placement locations that can be included in the information resource. In some implementations, the client device can obtain the predetermined number of third-party content placement locations from the information resource or an application for executing the information resource. Based on the comparison, the client device can determine whether or not to display the received third-party content item. For instance, upon determining that the number of existing third-party content placement locations is less than the predetermined number of third-party content placement locations, the client device can display the received third-party content item. In some implementations, the client device can determine not to display the third-party content item upon determining that the number of existing third-party content placement locations is greater than or equal to the predetermined number of third-party content placement locations.

Figure 5:
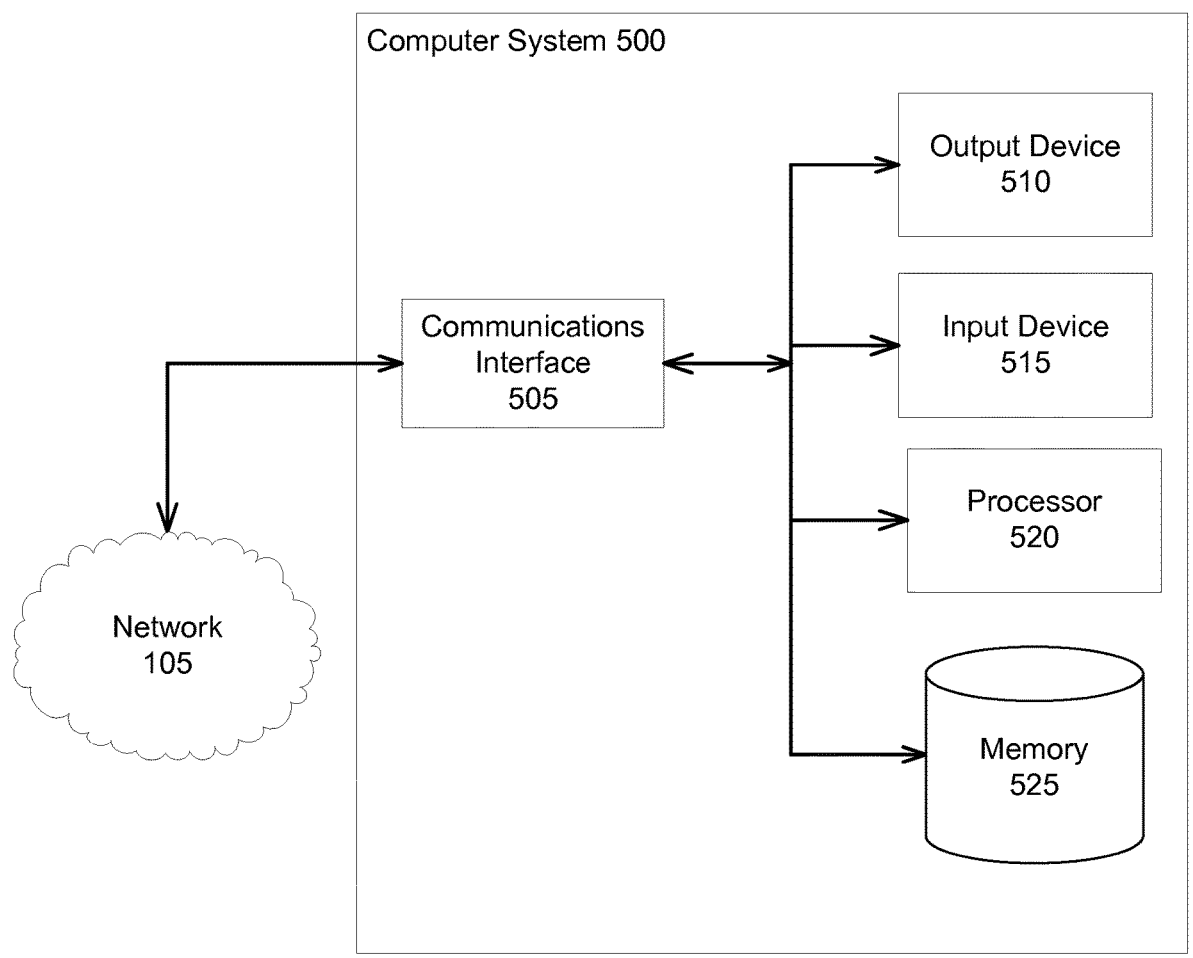
FIG. 5 is a block diagram depicting an illustrative implementation of a general architecture for a computer system that may be employed to implement elements of the systems and methods described and illustrated herein.

FIG. 5 shows the general architecture of an illustrative computer system 500 that may be employed to implement any of the computer systems discussed herein (including the system 110 and its components such as the content request module 130, the content selection module 135, and script provider module 140) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 110 or the other components of the system 110 such as the content request module 130 and the content selection module 135.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 525 to store information related to the availability of inventory of one or more content units, reservations of one or more content units, among others. The memory 525 can include the database 145. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1, one or more communications interfaces facilitate information flow between the components of the system 50. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the data processing system 50.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method for automatically managing placement of content slots in an information resource, wherein the information resource is a web page or other content displayed as part of the execution of an application on a computing device, the method comprising:
    storing, by a memory of a data processing system including one or more processors, computer program instructions including a first plurality of computer program instructions and a second plurality of computer program instructions;
    receiving, by the data processing system executing the first plurality of computer program instructions, from a computing device, a request for content responsive to the computing device receiving an information resource from a content publisher, the information resource including a third plurality of computer-executable instructions, wherein the third plurality of computer-executable instructions, when executed by one or more processors of the computing device, causes the computing device to identify a server of the data processing system; and
    transmitting, by the data processing system executing the first set of computer program instructions, responsive to the request for content, the second plurality of computer-executable instructions to the computing device,
    wherein the second plurality of computer-executable instructions, when executed by one or more processors of the computing device responsive to the request for content, cause the computing device to automatically:
        identify a Document Object Model (DOM) tree of the information resource received by the computing device from the content publisher;
        identify one or more DOM elements included in the DOM tree;
        determine, based on the identified DOM elements, one or more candidate third-party content placement locations according to a third-party content placement policy;
        select, from the candidate third-party content placement locations, a third-party content placement location in the DOM tree; and
        insert, in the information resource received by the computing device from the content publisher, a computer code corresponding to a third-party content slot, the computer code when executed by the computing device causes the computing device to display a third-party content item at the selected third-party content placement location.

2. The method of claim 1, wherein the third-party content placement policy includes one or more rules for identifying candidate third-party content placement locations, the rules based on dimensions of the identified DOM elements.

3. The method of claim 1, wherein selecting, from the candidate third-party content placement locations, a third-party content placement location in the DOM tree includes selecting a third-party content placement location that is between two adjacent DOM elements that have a width that is greater than a predetermined threshold of a width of the information resource.

4. The method of claim 1, wherein displaying a third-party content item at the selected third-party content placement location includes:
    identifying a revenue amount corresponding to displaying the third-party content item;
    determining that the revenue amount exceeds a predetermined threshold; and
    responsive to determining that the revenue amount exceeds the predetermined threshold, selecting the third-party content item for display.

5. The method of claim 1, wherein determining one or more candidate third-party content placement locations according to a third-party content placement policy includes determining a predetermined number of third-party content placement locations and responsive to determining the predetermined number of candidate third-party content placement locations, terminating instructions to determine candidate third-party content placement locations.

6. The method of claim 1, wherein the second plurality of computer-executable instructions includes computer-executable instructions, which when executed on the computing device, further causes the computing device to:
    identify a number of existing third-party content placements to be displayed on the information resource received by the computing device from the content publisher;
    determine that the number of existing third-party content placements is less than a predetermined number of third-party content placements; and
    responsive to determining that the number of existing third-party content placements is less than a predetermined number of third-party content placements, insert the computer code corresponding to the third-party content slot in the information resource received by the computing device from the content publisher.

7. The method of claim 1, wherein the computer code corresponding to the content slot, when executed on the computing device, further causes the computing device to:
    receive a third-party content from the data processing system; and determine to display the third-party content responsive to determining that a revenue associated with the received third-party content exceeds a threshold value.

8. A method for automatically managing placement of content slots in an information resource, wherein the information resource is a web page or other content displayed as part of the execution of an application on a computing device, the method comprising:

storing, by a memory of a data processing system including one or more processors, computer program instructions including a first set of computer program instructions and a second set of computer program instructions;

receiving, by the data processing system executing the first set of computer program instructions, from a computing device, a request for content; and transmitting, by the data processing system executing the first set of computer program instructions, responsive to the request for content, the information resource to the computing device for display thereon, the information resource including a content slot insertion script including the second set of computer program instructions, wherein the second set of computer program instructions, when executed by one or more processors of the computing, device responsive to receipt of the information resource by the computing device, cause the computing device to automatically:

identify a Document Object Model (DOM) tree of the information resource received by the computing device from the data processing system;

identify one or more DOM elements included in the DOM tree;

determine, based on the identified DOM elements, one or more candidate third-party content placement locations according to a third-party content placement policy;

select, from the candidate third-party content placement locations, a third-party content placement location in the DOM tree; and insert, in the information resource received by the computing device from the data processing system, a computer code corresponding to a third-party content slot, the computer code when executed by the computing device causes the computing device to display a third-party content item at the selected third-party content placement location.

9. The method of claim 8, wherein the third-party content placement policy includes one or more rules for identifying candidate third-party content placement locations, the rules based on dimensions of the identified DOM elements.

10. The method of claim 8, wherein selecting, from the candidate ad placement locations, a third-party content placement location in the DOM tree includes selecting a third-party content placement location that is between two adjacent DOM elements that have a width that is greater than a predetermined threshold of a width of the information resource.

11. The method of claim 8, wherein displaying a third-party content item at the selected ad placement location includes:

identifying a revenue amount corresponding to displaying the third-party content item;

determining that the revenue amount exceeds a predetermined threshold; and responsive to determining that the revenue amount exceeds the predetermined threshold, selecting the third-party content item for display.

12. The method of claim 8, wherein determining one or more candidate third-party content placement locations according to a third-party content placement policy includes determining a predetermined number of third-party content placement locations and responsive to determining the predetermined number of candidate third-party content placement locations, terminating instructions to determine candidate third-party content placement locations.

13. The method of claim 8, wherein the content slot insertion script, when executed on the computing device, further causes the computing device to automatically:

identify a number of existing third-party content placements to be displayed on the information resource;

determine that the number of existing third-party content placements is less than a predetermined number of third-party content placements; and responsive to determining that the number of existing third-party content placements is less than a predetermined number of third-party content placements, insert the computer code corresponding to the third-party content slot in the information resource received by the computing device from the data processing system.

14. A system for automatically managing placement of content slots in information resources, wherein the information resource is a web page or other content displayed as part of the execution of an application on a computing device, the system comprising:

a memory to store computer executable instructions that, when executed by one or processors of a computing device, responsive to a request generated by the computing device for content associated with an information resource, cause the computing device to:

automatically manage at the computing device placement of content slots on the information resource received by the computing device from a content publisher of the information resource, by:

identifying one or more Document Object Model (DOM) elements included in a DOM tree of the information resource received by the computing device from the content publisher of the information resource;

using a third-party content placement policy to determine a plurality of candidate third-party content locations in the DOM tree at which to insert a third-party content item based on the identified DOM elements; and selecting a third-party content placement location of the determined plurality of candidate third-party content placement locations, and automatically inserting in the information resource received by the computing device from the content publisher of the information resource, responsive to the request for content, a computer code corresponding to a third-party content slot, wherein the computer code when executed by the computing device causes the computing device to display a third-party content item at the selected third-party content placement location.

15. The system of claim 14, wherein the third-party content placement policy includes one or more rules for identifying candidate third-party content placement locations, the rules based on dimensions of the identified DOM elements.

16. The system of claim 14, wherein selecting, from the candidate third-party content placement locations, a third-party content placement location in the DOM tree includes selecting a third-party content placement location that is between two adjacent DOM elements that have a width that is greater than a predetermined threshold of a width of the information resource.

17. The system of claim 14, wherein displaying a third-party content item at the selected third-party content placement location includes:
- identifying a revenue amount corresponding to displaying the third-party content item;
- determining that the revenue amount exceeds a predetermined threshold; and
- responsive to determining that the revenue amount exceeds the predetermined threshold, selecting the third-party content item for display.

18. The system of claim 14, wherein the computer executable instructions, when executed by the one or processors of the computing device, further cause the computing device to:
- identify a number of existing third-party content placements to be displayed in the information resource received by the computing device from the content publisher of the information resource;
- determine that the number of existing third-party content placements is less than a predetermined number of third-party content placements; and
- responsive to determining that the number of existing third-party content placements is less than a predetermined number of third-party content placements, insert the computer code corresponding to the third-party content slot in the information resource.

19. The system of claim 14, wherein the computer code corresponding to the content slot, when executed, when executed on the computing device, further causes the computing device to:
- receive a third-party content item from the data processing system; and
- determine to display the third-party content item responsive to determining that a revenue associated with the received third-party content item exceeds a threshold value.

* * * * *

UNITED STATES PATENT AND TRADEMARK OFFICE
CERTIFICATE OF CORRECTION

| | | |
|---|---|---|
| PATENT NO. | : 12,002,072 B1 | Page 1 of 1 |
| APPLICATION NO. | : 14/856181 | |
| DATED | : June 4, 2024 | |
| INVENTOR(S) | : Matthew Strecker Burriesci et al. | |

It is certified that error appears in the above-identified patent and that said Letters Patent is hereby corrected as shown below:

In the Claims

At Column 32, Line 29, "one or" should be -- one or more --.

At Column 33, Line 13, "one or" should be -- one or more --.

At Column 34, Lines 9-10, "when executed, when executed" should be -- when executed --.

Signed and Sealed this
Nineteenth Day of August, 2025

Coke Morgan Stewart
*Acting Director of the United States Patent and Trademark Office*